US010759083B1

(12) United States Patent
Chang

(10) Patent No.: US 10,759,083 B1
(45) Date of Patent: Sep. 1, 2020

(54) MECHANISM FOR PIVOTING A LIMIT PLATE TO TOP OF A RIP FENCE

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 16/398,868

(22) Filed: Apr. 30, 2019

(51) Int. Cl.
*B27B 27/10* (2006.01)
*B23D 47/02* (2006.01)
*B27B 27/02* (2006.01)

(52) U.S. Cl.
CPC ............ *B27B 27/10* (2013.01); *B23D 47/025* (2013.01); *B27B 27/02* (2013.01)

(58) Field of Classification Search
CPC ......... B27B 27/00; B27B 27/02; B27B 27/04; B27B 27/06; B27B 27/08; B27B 27/10; B27B 5/16; B27B 5/181; B27B 5/22; B27B 5/222; B23D 47/025; B23D 47/04; B23D 47/045; Y10T 83/773; Y10T 83/727; Y10T 83/7647; Y10T 83/73; Y10T 83/732; Y10T 83/734; Y10T 83/7722; Y10T 83/7684; Y10T 83/7705
See application file for complete search history.

(56) References Cited

U.S. PATENT DOCUMENTS

| | | | | |
|---|---|---|---|---|
| 1,113,153 A | * | 10/1914 | Clement ................. | B27B 27/02 83/438 |
| 4,418,597 A | * | 12/1983 | Krusemark .............. | B26D 7/01 144/251.1 |
| 7,127,976 B1 | * | 10/2006 | Fitzsimmons ....... | B23D 47/045 83/435.11 |
| 2012/0006167 A1 | * | 1/2012 | Liu ...................... | B23D 47/025 83/444 |
| 2015/0107429 A1 | * | 4/2015 | Ceroll .................... | B27B 27/10 83/468.7 |

* cited by examiner

*Primary Examiner* — Stephen Choi

(57) ABSTRACT

A table saw includes a base assembly; a table assembly mounted on the base assembly and including a table; a slide mechanism mounted on the table assembly; and a rip fence assembly mounted on one side of the table assembly. The rip fence assembly includes a receptacle in a lower portion of one end; an elongated limit plate including two 90-degree bent arms at two ends respectively, each bent arm including a slot having a first end and a second end; a limit seat facing the receptacle; a spring-biased detent anchored in the receptacle and urging against an inner surface of the limit seat by passing through the second end of the slot; and a pivot disposed on an upper portion of one end of the rip fence assembly and disposed through the first end of the slot.

2 Claims, 11 Drawing Sheets

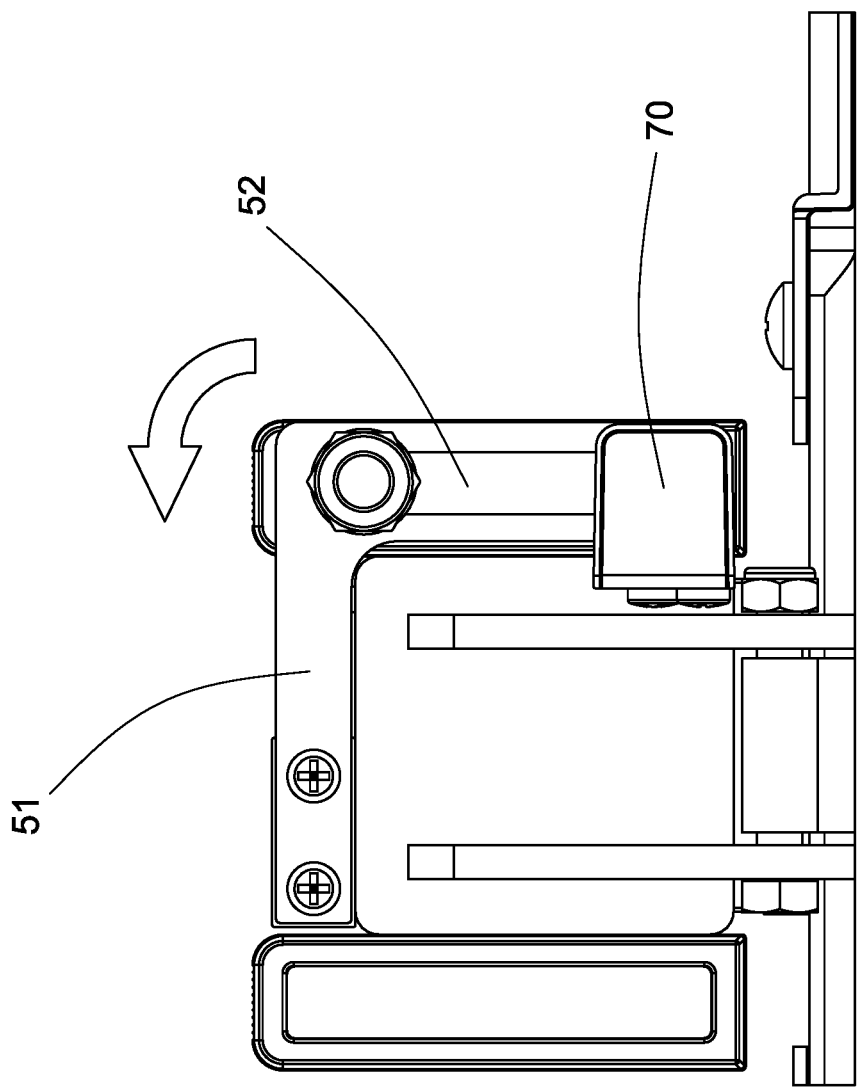

US 10,759,083 B1

MECHANISM FOR PIVOTING A LIMIT PLATE TO TOP OF A RIP FENCE

BACKGROUND OF THE INVENTION

1. Field of the Invention

The invention relates to table saws and more particularly to a mechanism capable of counterclockwise pivoting a limit plate to a top of a rip fence of a table saw to be inoperative, or clockwise pivoting the limit plate to a top of a table to be ready for use.

2. Description of Related Art

U.S. Pat. No. 9,095,989 to Chang, entitled "rip fence with locking mechanisms", discloses a table saw including a movable rip fence and a base including an upper cutting surface through which a blade extends. The rip fence includes front and rear clamping mechanisms connected to front and rear ends of a casing respectively. The front clamping mechanism includes a frame, a lever pivotably secured to the frame to be pivotal between a locked position and a released position, the lever having an internal cam member, a clamping member pivotably secured to the lever, the clamping member having a hook at an open end, a spring biased shaft, and a C-clip for retaining an inner end of the shaft in the frame. A pivotal movement of both the lever and the clamping member causes the cam member to push the shaft inward until the shaft is pushed outward to urge against the cam member in the locked position.

U.S. Pat. No. 9,731,432 to Chang, entitled "rip fence with locking device", discloses a moveable rip fence of a table saw comprising a housing including an elongated top opening, a seat secured to an underside of top of the housing, the seat having a lower through hole, and a stop member across two sides of the housing, a lever pivotably fastened in the elongated opening; a link pivotably interconnecting the lever and a spring biased rod, an inverted L-shaped limit member secured across two sides of the housing; a clamping member having a top secured by a support member and including an intermediate hole member and a projecting base member; and a locking member including a lower wedge member fastened on the base member, and a flexible inclined member on a top. The lever is flush with the top of the housing in a locked position. A pressing of a rear portion of the lever unlocks the rip fence.

U.S. Pat. No. 10,183,415 to Chang, entitled "table saw", discloses a table saw comprising a table, a saw, a track, a slide strip, and a fence member. The table has an axial direction and a radial direction which are orthogonal to each other. The saw is arranged at a predetermined position of the table. The track is arranged at each side of the table. The slide strip is slidably engaged with the track. An outer surface of the slide strip opposite to the track has a first position part, a second position part, and a third position part. The first position part and the second position part are respectively arranged at two ends of the slide strip and the third position part is arranged at a center of the slide strip. The fence member is bridged on the table and secured to one of the first position part, the second position part, and the third position part.

While the table saws enjoy their success in the market, continuing improvements in the exploitation of table saw of this type are constantly being sought.

SUMMARY OF THE INVENTION

It is therefore one object of the invention to provide a table saw comprising a base assembly; a table assembly mounted on the base assembly and including a table; a slide mechanism mounted on the table assembly; and a rip fence assembly mounted on one side of the table assembly and comprising a receptacle in a lower portion of a front end; an elongated limit plate including two 90-degree bent arms at two ends respectively, each arm having a slot having a first end and a second end, and two opposite sides; two limit seats each disposed on a lower portion of either end of the rip fence assembly and adjacent to the receptacle, each limit seat including a sliding groove and a limit end; a spring-biased detent anchored in the receptacle, the second end of the slot, and the sliding groove to urge against an inner surface of the limit seat; two pivots each disposed on an upper portion of either end of the rip fence assembly and disposed through the first end of the slot; and two fasteners each for fastening the pivot and the rip fence assembly together.

The above and other objects, features and advantages of the invention will become apparent from the following detailed description taken with the accompanying drawings.

BRIEF DESCRIPTION OF THE DRAWINGS

FIG. 5B is a view similar to FIG. 5A showing the limit plate pivoted to a top of the rip fence assembly to be inoperative;

DETAILED DESCRIPTION OF THE INVENTION

Figure 1:
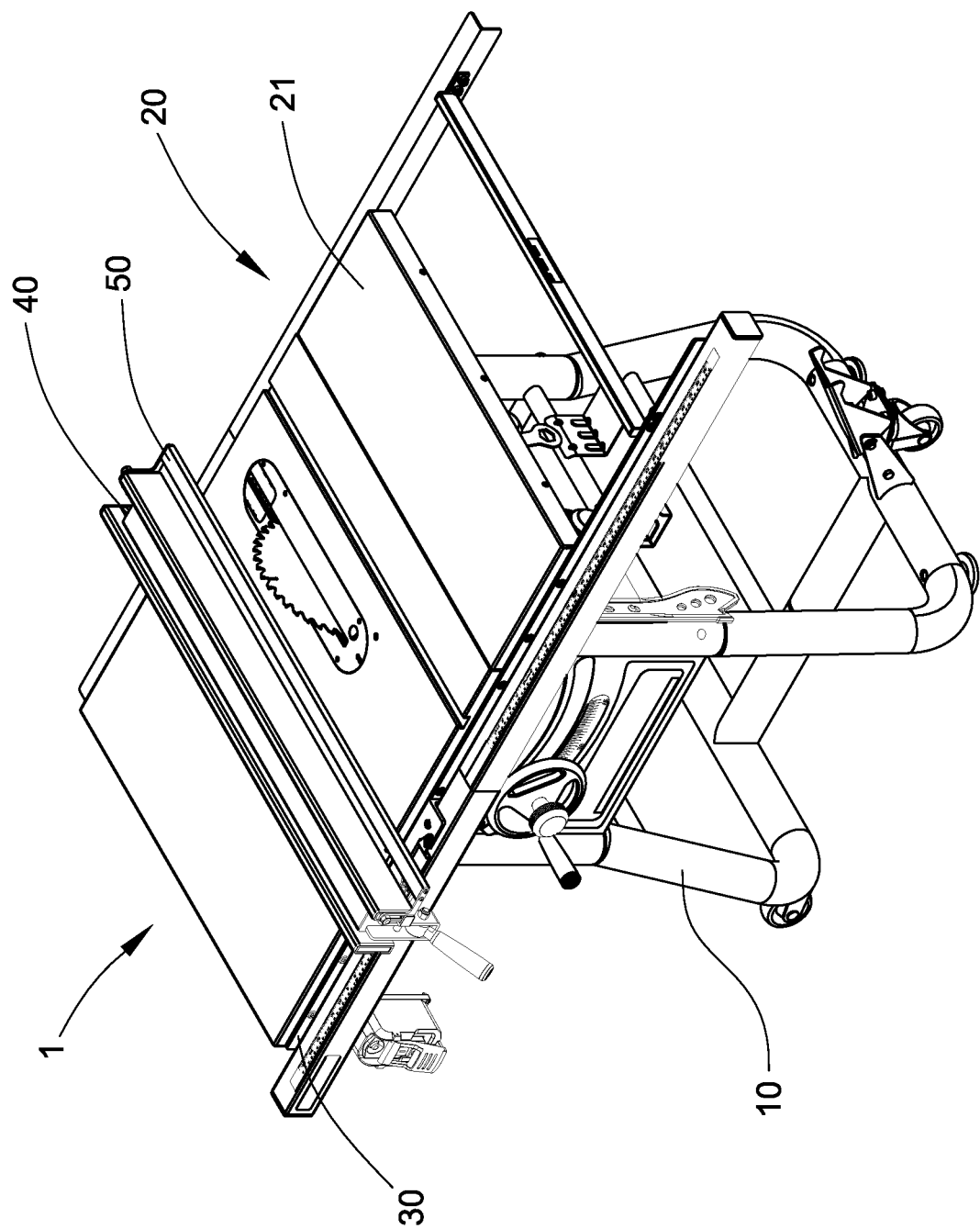
FIG. 1 is a perspective view of a table saw incorporating a slide mechanism, a rip fence assembly and a pivot mechanism according to the invention.
Figure 2:
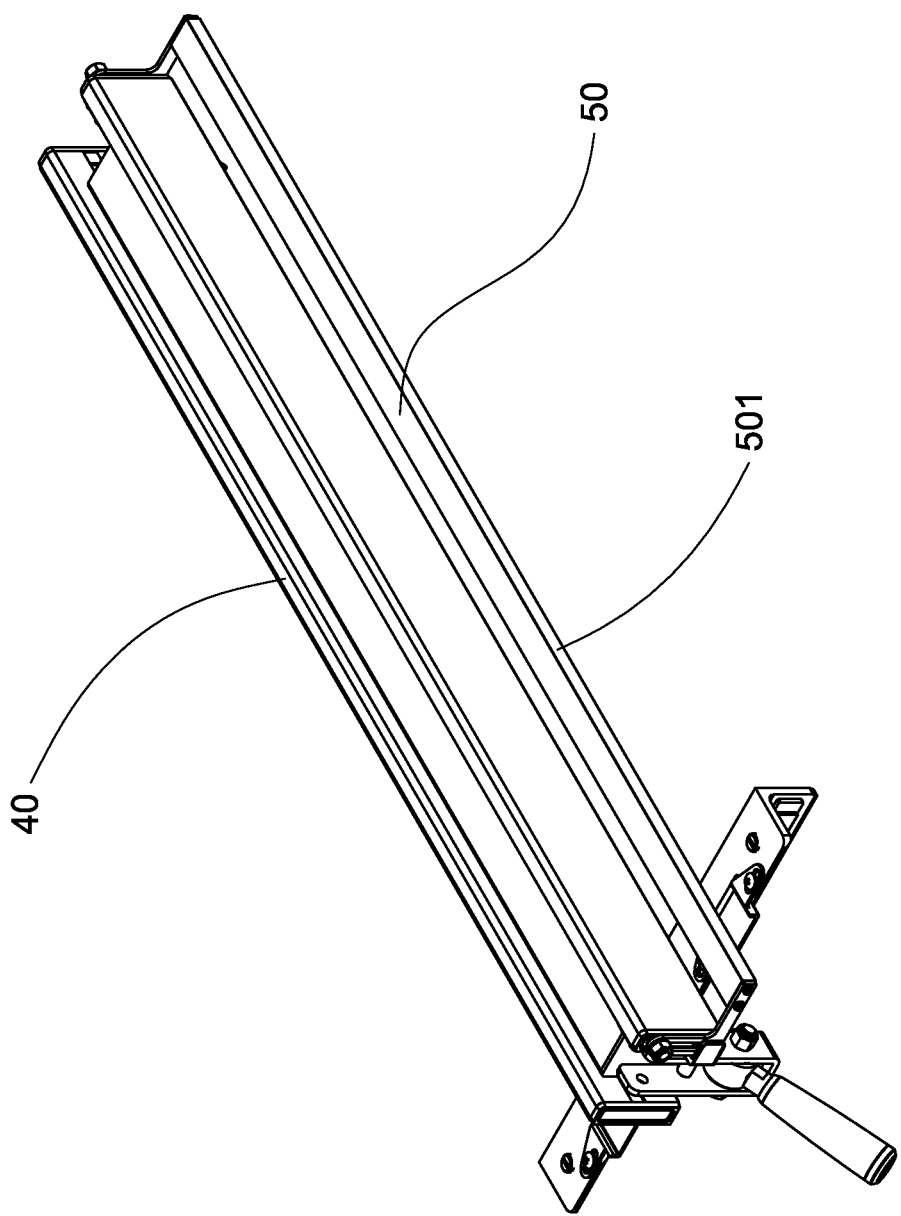
FIG. 2 is a perspective view of the rip fence assembly.
Figure 3:
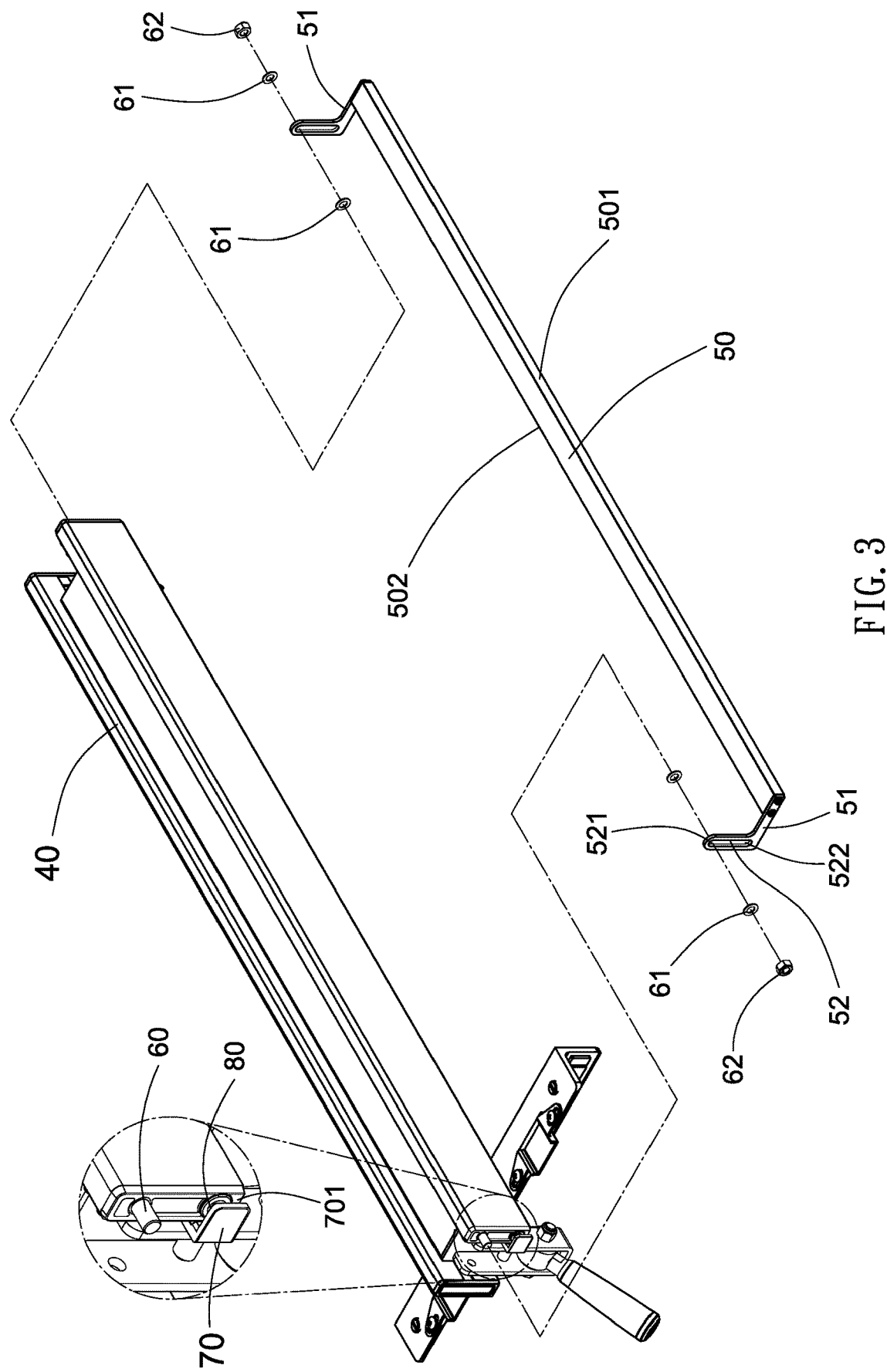
FIG. 3 is an exploded perspective view of FIG. 2.

Referring to FIGS. 1 to 9, a table saw 1 in accordance with the invention comprises a base assembly 10, a table assembly 20 mounted on the base assembly 10 and including a table 21, a slide mechanism 30 mounted on the table assembly 20, and a rip fence assembly 40 mounted on the left side of the table assembly 20.

The rip fence assembly 40 incorporating a pivot mechanism as the subject of the invention is discussed in detail below.

An elongated limit plate 50 includes two 90-degree bent arms 51 at two ends respectively, and two opposite sides 501 and 502 for urging against a workpiece (not shown) on the table 21 and configured to be pressed by the hand respectively in operation. Each arm 51 includes a slot 52 having a first end 521 and a second end 522 adjacent to the horizontal part thereof. Two limit seats 70 each is disposed on a lower portion of either end of the rip fence assembly 40. Each limit seat 70 has a sliding groove 701 and a limit end 702. A receptacle 41 is formed in the lower portion of the rip fence assembly 40 adjacent to the limit seat 70. A compression spring 81 is anchored in the receptacle 41. In a ready to use position, a steel ball 80 is disposed in the receptacle 41, the second end 522, and the sliding groove 701 to urge against an inner surface of the limit seat 70 due to the expansion of the compression spring 81. Two pivots 60 each is disposed on an upper portion of either end of the rip fence assembly 40 by disposing through the first end 521 of the slot 52 of the limit plate 50. A plurality of washers 61 are provided on two opposite surfaces of the first end 521 of the slot 52 of the limit plate 50 respectively for increasing stability of a pivotal operation of the limit plate 50 on either pivot 60. Further, two nuts 62 each is provided to position the washers 61 and the pivot 60.

Figure 4:
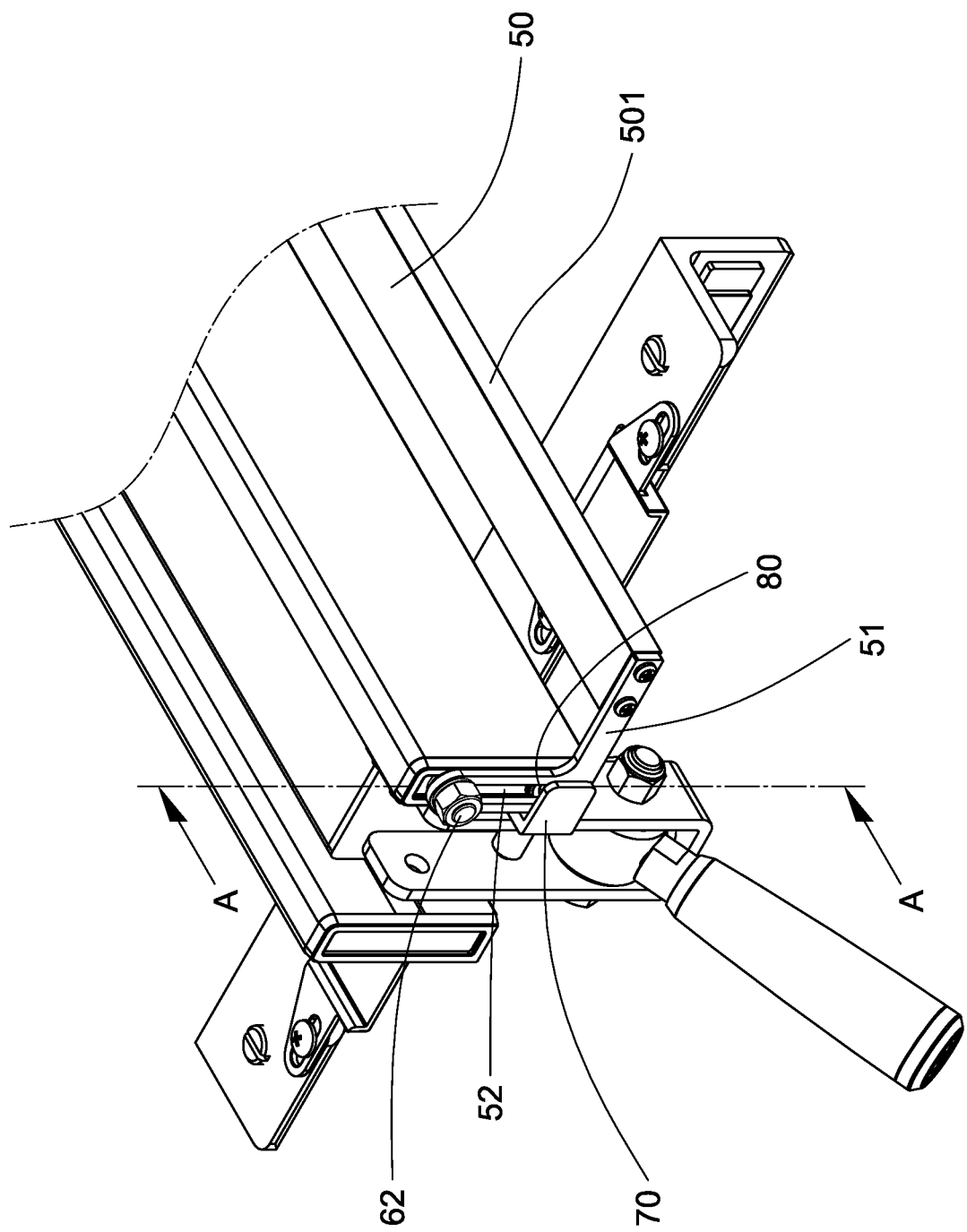
FIG. 4 is a perspective view of the pivot mechanism and a portion of the rip fence assembly.
Figure 4A:
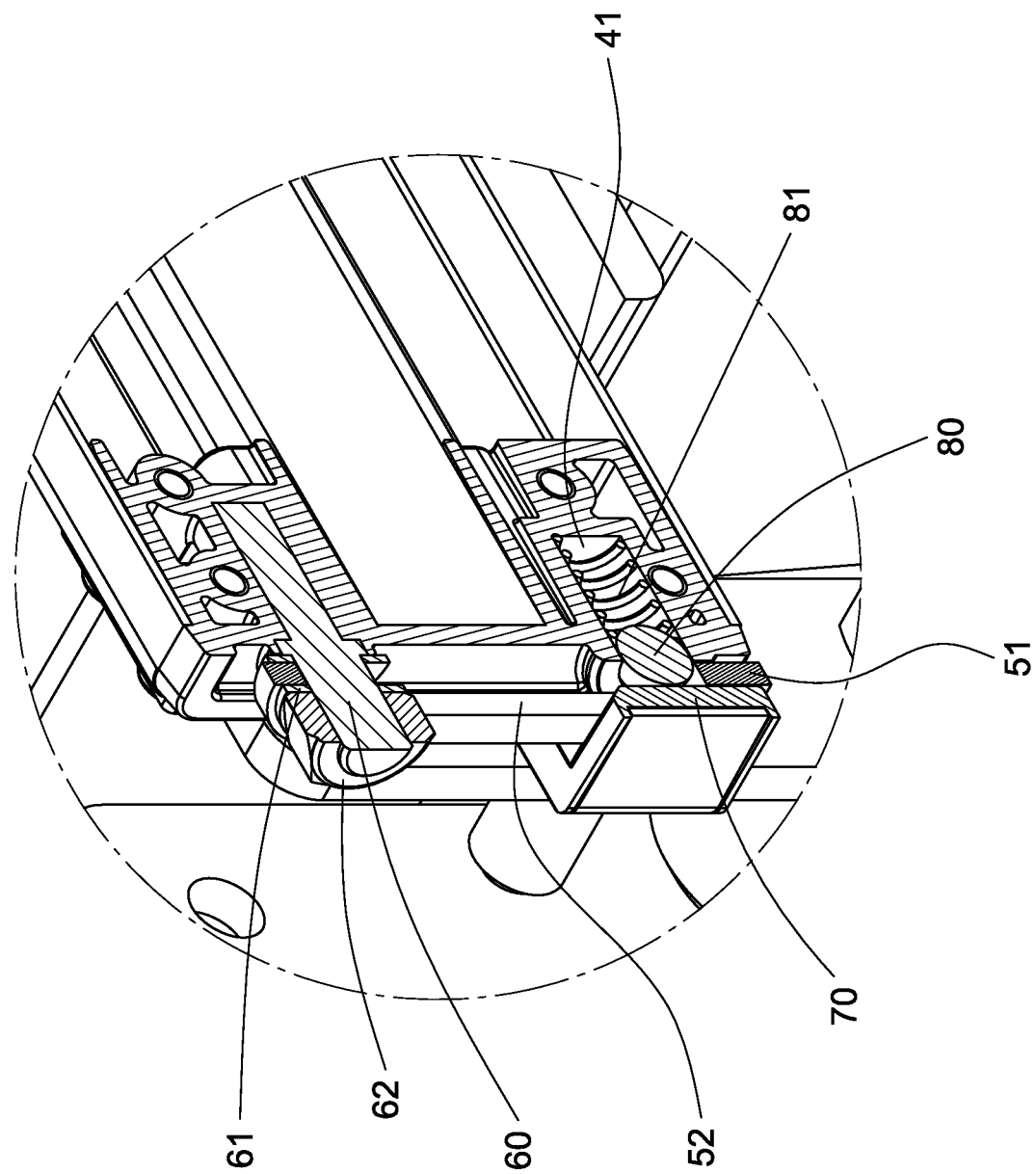
FIG. 4A is a sectional view taken along line A-A of FIG. 4.
Figure 9:
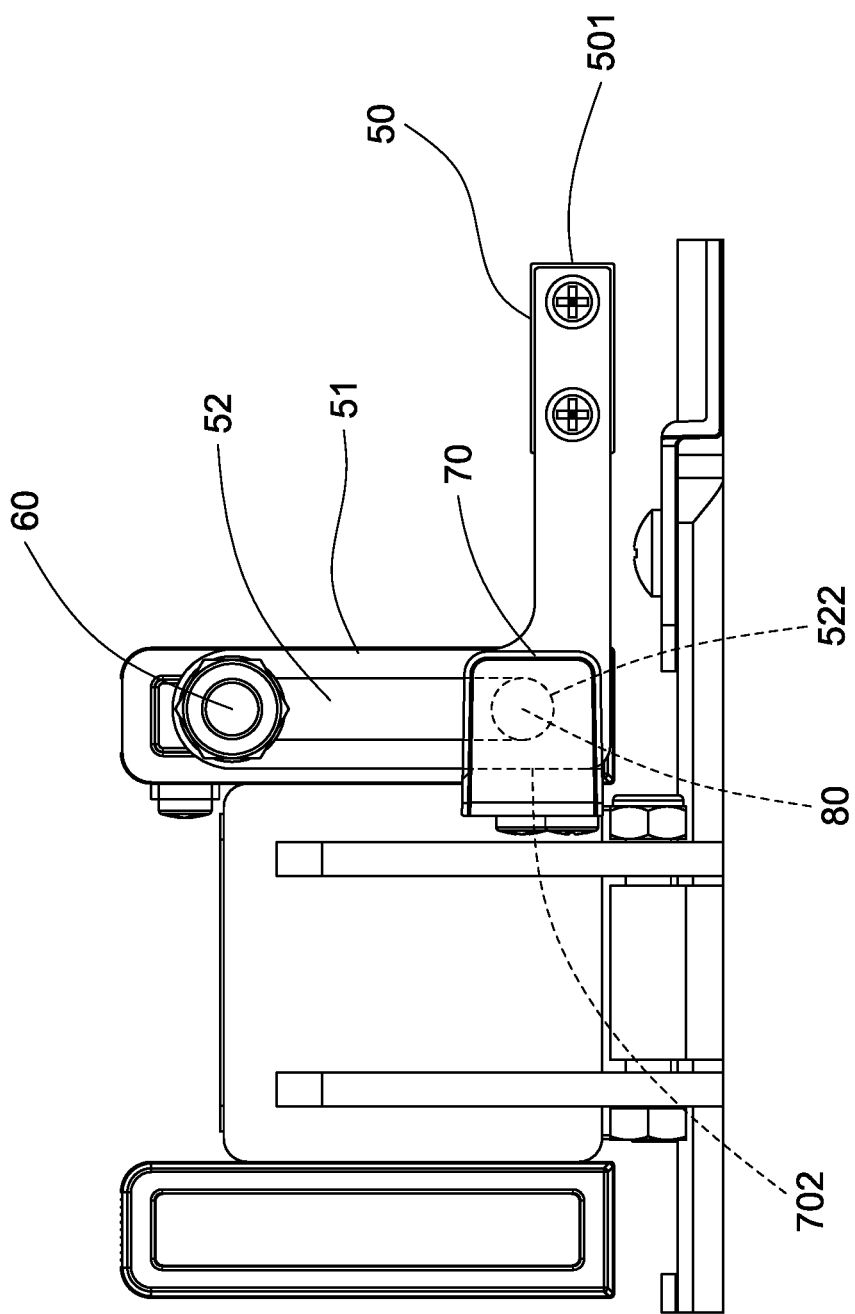
FIG. 9 is a view similar to FIG. 8 showing the fully pivoted limit plate disposed above the table in a ready to use position.

As shown in FIGS. 1, 4 and 9 specifically, the limit plate 50 is disposed above the table 21 by a distance of 0.5 mm in a ready to use position.

Figure 5A:
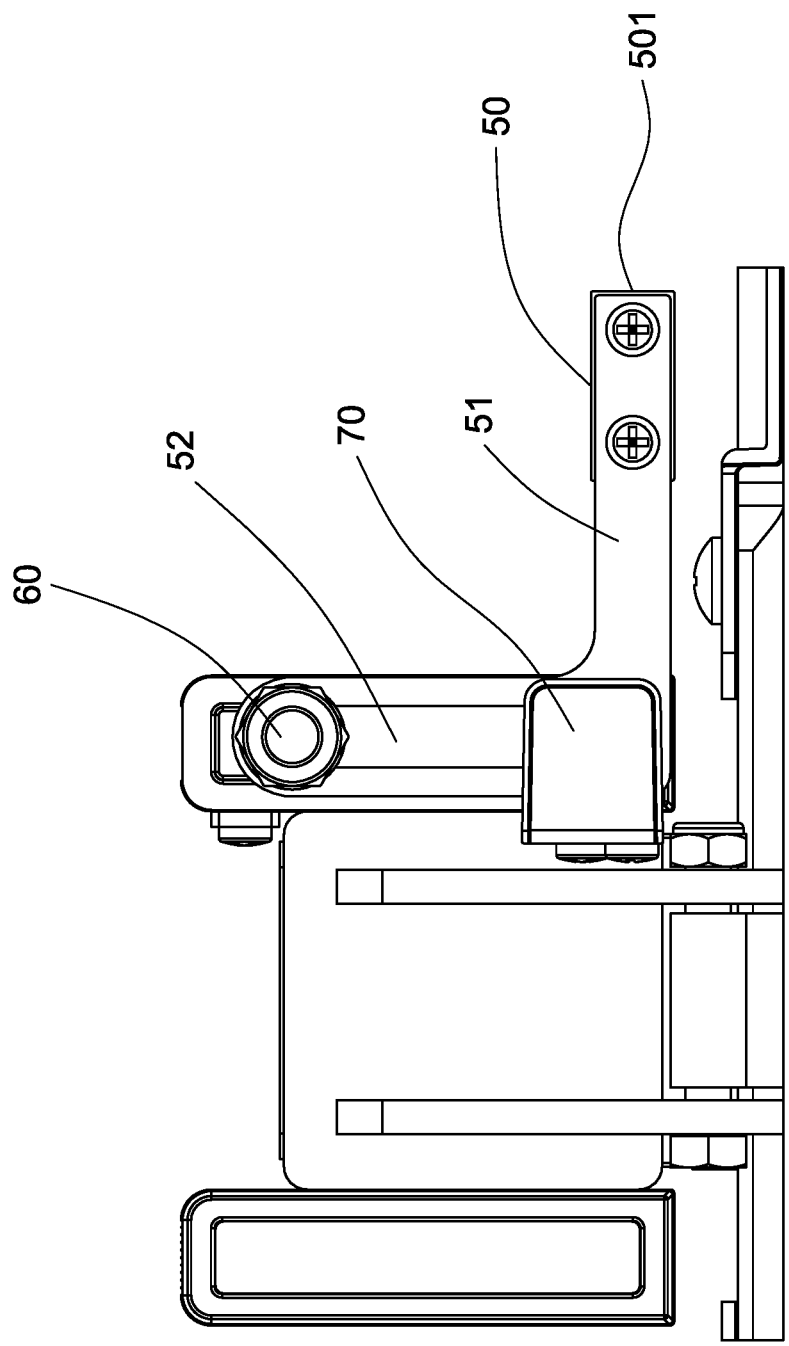
FIG. 5A is a side elevation of FIG. 2 showing the limit plate in a ready to use position.
Figure 6:
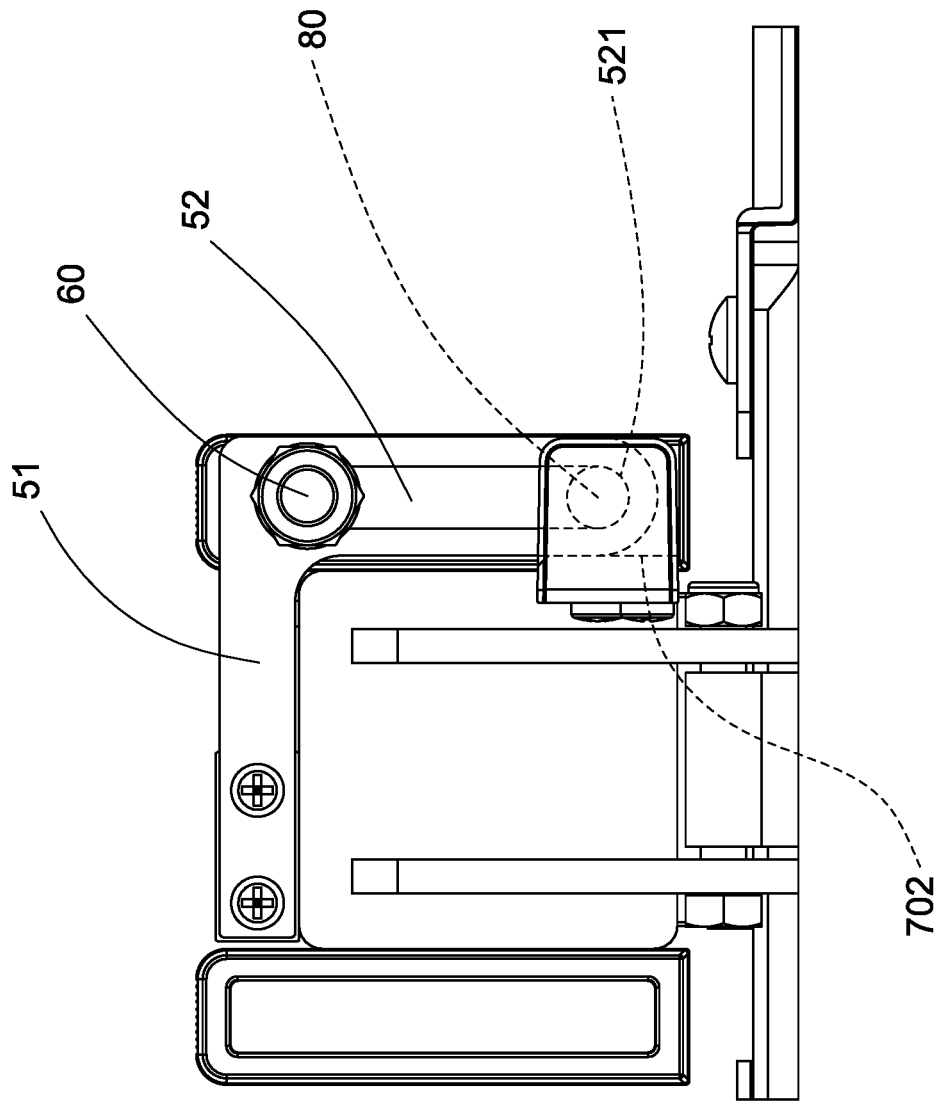
FIG. 6 is a view similar to FIG. 5B showing the steel ball and a first end of a slot of the limit plate in phantom.

As shown in FIGS. 5A, 5B, and 6 specifically, an individual may lift the limit plate 50 to disengage the steel ball 80 from the second end 522 of the slot 52 of the limit plate 50 by compressing the compression spring 81 and continue the lifting until the second end 522 of the slot 52 of the limit plate 50 contacts and is stopped by the pivot 60. The compression spring 81 expands immediately to urge the steel ball 80 against the limit seat 70 after disengaging the second end 522 of the slot 52 of the limit plate 50 from the steel ball 80. Next, the individual may counterclockwise rotate the limit plate 50 about 180 degrees on each pivot 60 until each first end 521 of the slot 52 of the limit plate 50 pushes the steel ball 80 away from the limit seat 70 with the compression spring 81 being compressed. Finally, the compression spring 81 pushes the steel ball 80 through the first end 521 of the slot 52 of the limit plate 50 to urge against the limit seat 70, i.e., locked. This is an inoperative position of the limit plate 50 (FIG. 6).

Figure 7:
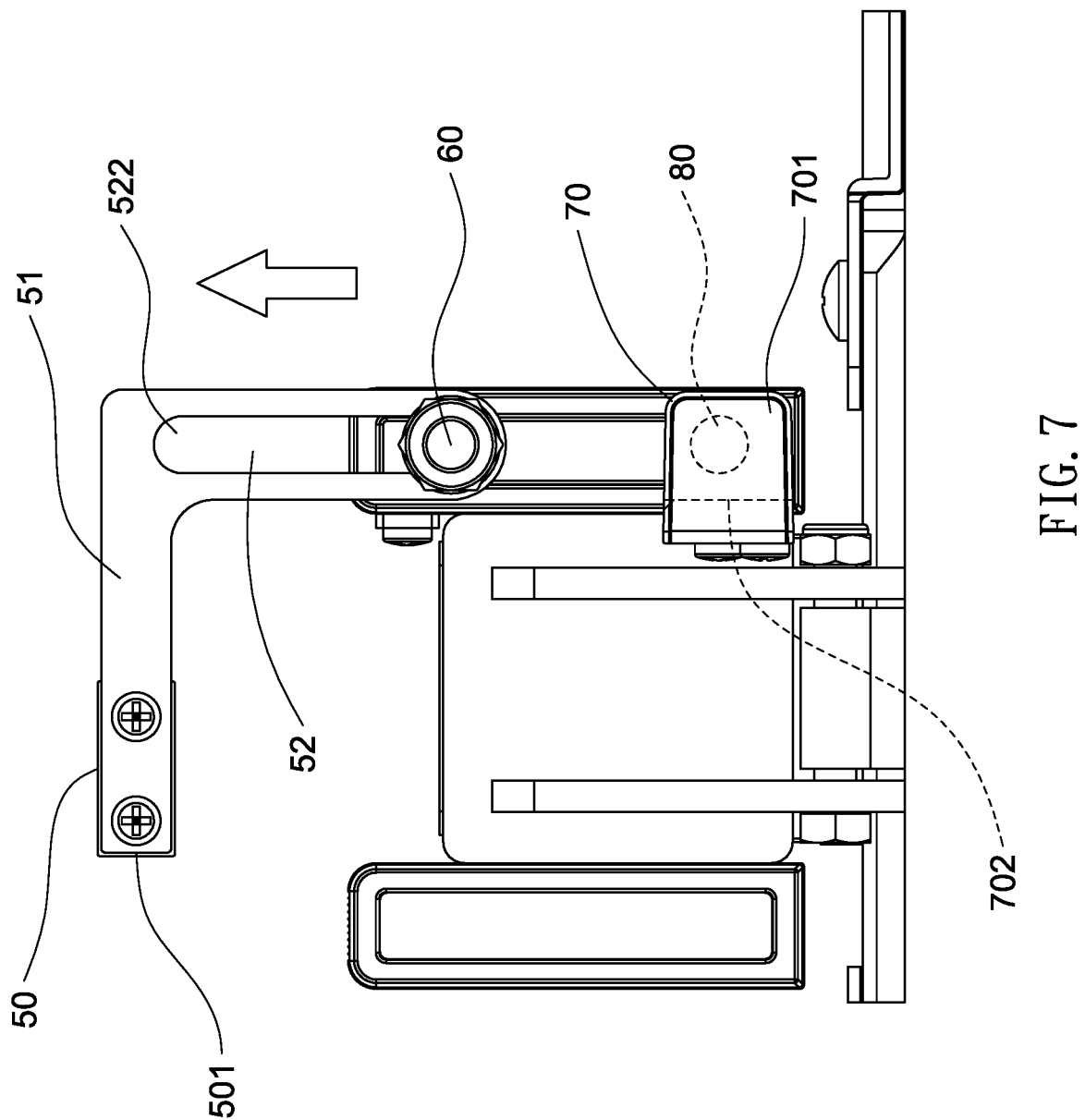
FIG. 7 is a view similar to FIG. 6 showing the lifting limit plate.
Figure 8:
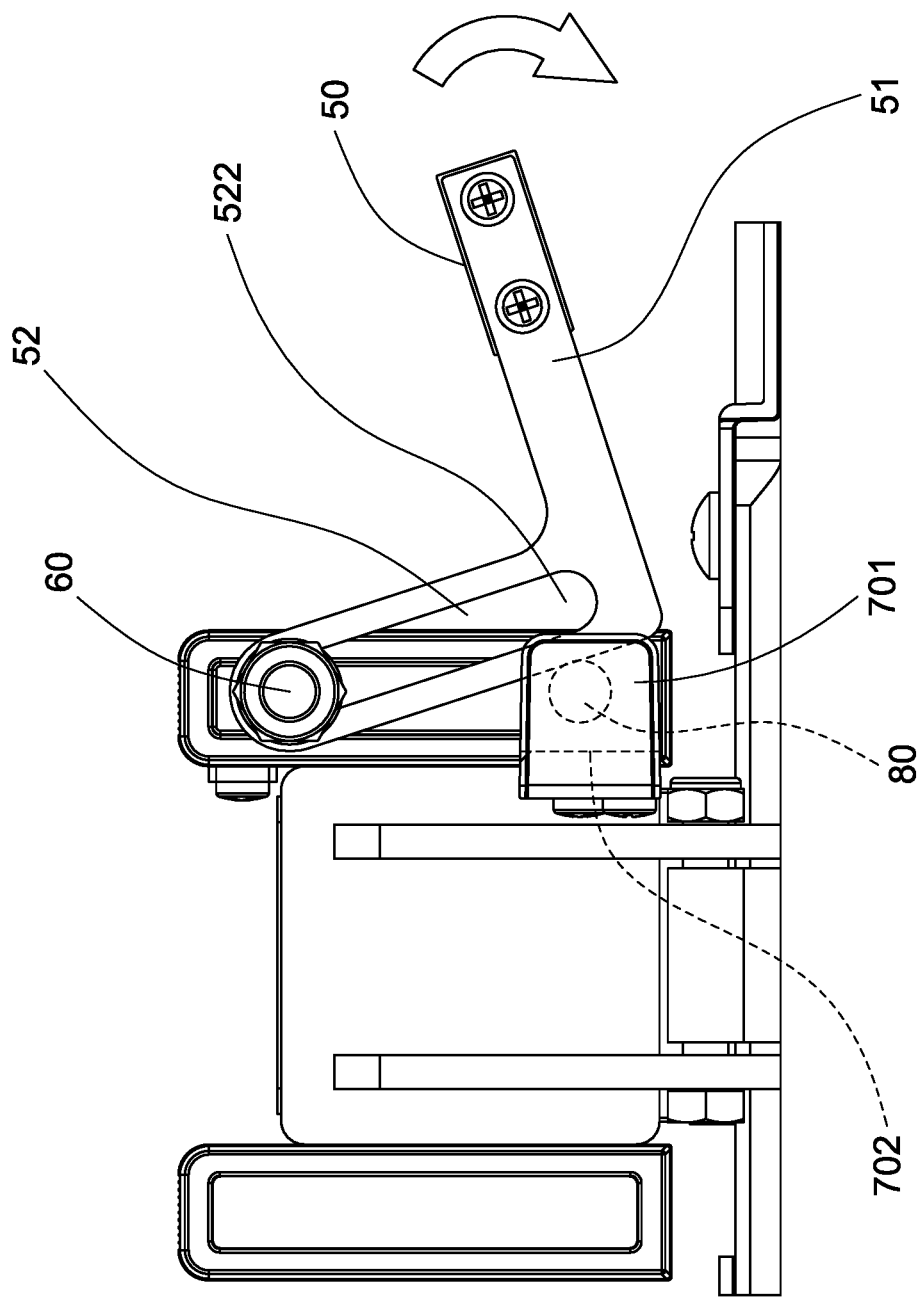
FIG. 8 is a view similar to FIG. 7 showing the clockwise pivoting limit plate.

As shown in FIGS. 7, 8 and 9 specifically, the individual may lift the limit plate 50 to disengage the steel ball 80 from the first end 521 of the slot 52 of the limit plate 50 by compressing the compression spring 81 and continue the lifting until each first end 521 of the slot 52 of the limit plate 50 contacts and is stopped by the pivot 60. The compression spring 81 expands immediately to urge the steel ball 80 against the limit seat 70 after disengaging each first end 521 of the slot 52 of the limit plate 50 from the steel ball 80. Next, the individual may clockwise rotate the limit plate 50 about 180 degrees on the pivot 60 until each second end 522 of the slot 52 of the limit plate 50 pushes the steel ball 80 away from the limit seat 70 with the compression spring 81 being compressed. Finally, the compression spring 81 pushes the steel ball 80 through the second end 522 of the slot 52 of the limit plate 50 to urge against the limit seat 70, i.e., locked. This is a ready to use position of the limit plate 50 (FIG. 9). At this time, each second end 522 of the slot 52 of the arm 51 is disposed at the sliding groove 701 of each limit seat 70 and urged against the limit end 702. The individual may urge one side 501 of the elongated limit plate 50 to against a workpiece (not shown).

While the invention has been described in terms of preferred embodiments, those skilled in the art will recognize that the invention can be practiced with modifications within the spirit and scope of the appended claims.

What is claimed is:

1. A table saw comprising:
a base assembly;
a table assembly mounted on the base assembly and including a table;
a slide mechanism mounted on the table assembly; and
a rip fence assembly mounted on one side of the table assembly and including first and second pivots each disposed on an upper portion of either end of the rip fence assembly;
a receptacle disposed in a lower portion of one end of the rip fence assembly and below the first pivot, the receptacle including a compression spring and a steel ball both disposed therein;
a limit seat disposed on a lower portion of the rip fence assembly, the limit seat being shaped as an L and including first and second boards adjacent to the receptacle, the second board having one end attached to the rip fence assembly, and a sliding groove disposed between the first board and the receptacle, wherein the steel ball is elastically disposed in the sliding groove and urges against an inner surface of the first board; and
an elongated limit plate including first and second 90-degree bent arms at two ends respectively, the first 90-degree bent arm including a first straight slot having a first end and a second end, and the second 90-degree bent arm including a second straight slot having a first end and a second end, wherein the first pivot is further disposed through the first straight slot and the second pivot is further disposed through the second straight slot;
wherein in a cutting operation, the first pivot is pivotably connected to the first end of the first straight slot and the second pivot is pivotably connected to the first end of the second straight slot; the steel ball is pivotably connected to the second end of the first straight slot and elastically urges against the inner surface of the first board; and a bottom of the first 90-degree bent arm is slidably disposed on the sliding groove and urges against an inner surface of the second board; and
wherein in a folding operation, the first pivot is pivotably connected to the second end of the first straight slot and the second pivot is pivotably connected to the second end of the second straight slot; and the steel ball is pivotably connected to the first end of the first straight slot and elastically urges against the inner surface of the first board.

2. The table saw of claim 1, further comprising a first fastener for positioning the first pivot in the first straight slot of the first 90-degree bent arm, and a second fastener for positioning the second pivot in the second straight slot of the second 90-degree bent arm.

* * * * *